US012565107B2

(12) United States Patent
Jeon et al.

(10) Patent No.: US 12,565,107 B2
(45) Date of Patent: Mar. 3, 2026

(54) SERVER AND SYSTEM FOR CONTROLLING DRIVING OF A VEHICLE, AND METHOD THEREOF

(71) Applicants: Hyundai Motor Company, Seoul (KR); Kia Corporation, Seoul (KR)

(72) Inventors: Byeong Wook Jeon, Seoul (KR); Jung Hwan Bang, Seoul (KR); Hyung Seuk Ohn, Seoul (KR); Hee Yeon Nah, Seoul (KR); Won Seok Jeon, Anyang-si (KR); Ki Sang Kim, Seoul (KR); Dong Hoon Won, Suwon-si (KR); Dong Hoon Jeong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 224 days.

(21) Appl. No.: 18/298,612

(22) Filed: Apr. 11, 2023

(65) Prior Publication Data

US 2024/0174087 A1 May 30, 2024

(30) Foreign Application Priority Data

Nov. 30, 2022 (KR) ........................ 10-2022-0164545

(51) Int. Cl.
*B60L 15/20* (2006.01)
*G08G 1/00* (2006.01)

(52) U.S. Cl.
CPC ................ *B60L 15/20* (2013.01); *G08G 1/22* (2013.01); *B60L 2250/18* (2013.01); *B60L 2250/20* (2013.01)

(58) Field of Classification Search
CPC .. B60L 15/20; B60L 2250/18; B60L 2250/20; G08G 1/22
See application file for complete search history.

(56) References Cited

U.S. PATENT DOCUMENTS

| | | | |
|---|---|---|---|
| 10,904,891 B2 | 1/2021 | Ju et al. | |
| 11,377,110 B2 | 7/2022 | Yokoyama et al. | |
| 2013/0325230 A1 | 12/2013 | Kim | |
| 2016/0001781 A1* | 1/2016 | Fung ........................ | G07C 9/37 |
| | | | 701/36 |
| 2018/0186360 A1* | 7/2018 | Jo .......................... | B60W 20/15 |
| 2018/0307228 A1* | 10/2018 | Smith ................ | B60W 60/001 |
| 2019/0099118 A1* | 4/2019 | Patel ..................... | A61B 5/746 |
| 2019/0289610 A1 | 9/2019 | Ju et al. | |
| 2021/0031803 A1* | 2/2021 | Cussigh ............. | B60W 50/082 |

(Continued)

FOREIGN PATENT DOCUMENTS

| | | |
|---|---|---|
| JP | 6922937 B2 | 8/2021 |
| JP | 6962435 B1 | 11/2021 |

(Continued)

*Primary Examiner* — Navid Z. Mehdizadeh
(74) *Attorney, Agent, or Firm* — SLATER MATSIL, LLP

(57) ABSTRACT

An embodiment server includes a processor configured to collect driving data based on a driver driving propensity or a driving situation from a plurality of vehicles and to change information for determining an output torque suitable for each of the vehicles by analyzing the driving data and a communication device configured to transmit the changed information for determining the output torque to the vehicles by communicating with the vehicles.

16 Claims, 10 Drawing Sheets

(56)           References Cited

U.S. PATENT DOCUMENTS

| | | | |
|---|---|---|---|
| 2021/0319332 | A1 | 10/2021 | Isaac |
| 2021/0350636 | A1 | 11/2021 | Tang et al. |
| 2022/0111850 | A1 | 4/2022 | Yokoyama et al. |
| 2022/0266691 | A1* | 8/2022 | Laitsaari ................ A61B 5/165 |
| 2024/0174236 | A1* | 5/2024 | Jeon ..................... B60W 40/08 |

FOREIGN PATENT DOCUMENTS

| | | | |
|---|---|---|---|
| KR | 101826537 | B1 | 3/2018 |
| KR | 102314864 | B1 | 10/2021 |
| KR | 20220052854 | A | 4/2022 |

* cited by examiner

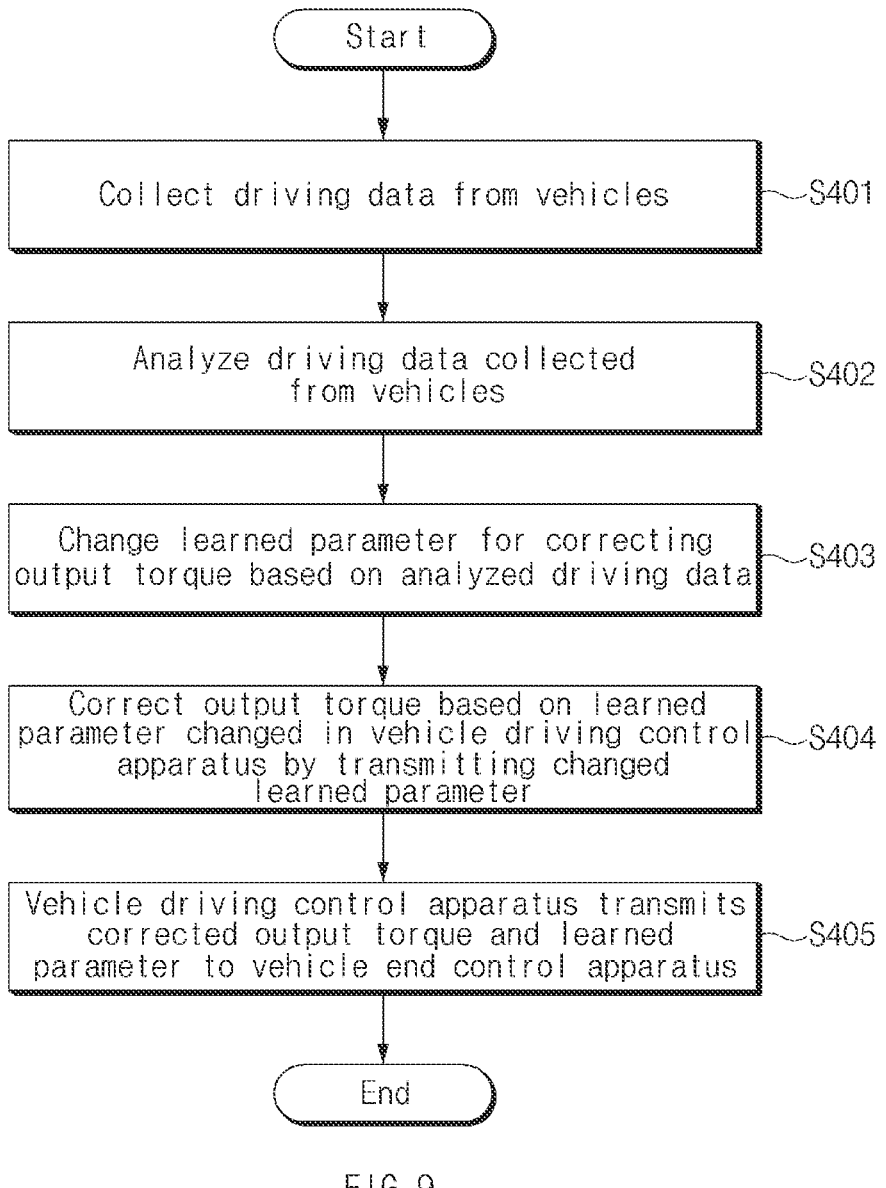

Start

Collect driving data from vehicles ~S401

Analyze driving data collected from vehicles ~S402

Change learned parameter for correcting output torque based on analyzed driving data ~S403

Correct output torque based on learned parameter changed in vehicle driving control apparatus by transmitting changed learned parameter ~S404

Vehicle driving control apparatus transmits corrected output torque and learned parameter to vehicle end control apparatus ~S405

End

FIG.9

SERVER AND SYSTEM FOR CONTROLLING DRIVING OF A VEHICLE, AND METHOD THEREOF

CROSS-REFERENCE TO RELATED APPLICATIONS

This application claims the benefit of Korean Patent Application No. 10-2022-0164545, filed on Nov. 30, 2022, which application is hereby incorporated herein by reference.

TECHNICAL FIELD

The present disclosure relates to a server for vehicle driving control, a system therefor, and a method therefor.

BACKGROUND

A general power control mechanism of a vehicle mainly generates driving torque (acceleration) proportional to an accelerator pedal manipulation amount and regenerative torque (deceleration) proportional to a brake manipulation amount. To this end, in the existing electric vehicle power control device, control is performed to output torque based on a set rule by receiving an accelerator pedal amount and a brake manipulation amount.

However, the performance of a vehicle is affected by various external variables such as driver individual propensity, weather in a driving area, traffic conditions, and road conditions, and acceleration/deceleration torque of the vehicle may be optimally controlled by appropriately responding to the external variables in order to improve driver satisfaction by improving driving performance of the vehicle.

AI (artificial intelligence)-based intelligent control such as deep learning or reinforcement learning is effective for an optimal determination result and control amount determination using multi-dimensional input variables, but since hardware calculation performance of the existing control device is low-end that can digest only a level of simple rule-based algorithms, it is impossible to operate AI algorithms that require rapid computational processing using large amounts of memory.

For this purpose, when computational performance (CPU and memory) of an existing controller is increased, existing hardware and software may be significantly improved to respond to a changed computing environment, and in this case, a problem arises in which safety of a legacy software code for control, which has been sufficiently verified in the past, cannot be guaranteed.

The above information disclosed in this background section is only for enhancement of understanding of the background of embodiments of the disclosure, and therefore, it may contain information that does not form the prior art that is already known to a person of ordinary skill in the art.

SUMMARY

The present disclosure relates to a server for vehicle driving control, a system therefor, and a method therefor. Particular embodiments relate to a technique for improving energy efficiency and personalized driving performance by sharing driving data of vehicles through a cloud server.

An exemplary embodiment of the present disclosure provides a server for vehicle driving control and a system therefor capable of improving driving performance of a vehicle by collecting already learned parameters from vehicles in a cloud server and re-learning the parameters of the AI algorithm for vehicle driving based on the collected parameters.

In addition, an exemplary embodiment of the present disclosure provides a server for vehicle driving control and a system therefor capable of performing vehicle driving control by reflecting a driver personalized characteristic in conjunction with a mobile device and an autonomous driving control apparatus and extending comprehensive computational performance of a vehicle controller without redesigning hardware of an existing vehicle controller, thereby improving driving performance of the vehicle.

The technical embodiments of the present disclosure are not limited to the embodiments mentioned above, and other technical embodiments not mentioned may be clearly understood by those skilled in the art from the description of the claims.

An exemplary embodiment of the present disclosure provides a server including a processor configured to collect driving data based on at least one of a driver driving propensity or a driving situation from a plurality of vehicles and to change information for determining output torque suitable for each of the vehicles by analyzing the driving data and a communication device configured to transmit the changed information for determining output torque to the vehicles by communicating with the vehicles.

In an exemplary embodiment of the present disclosure, the processor may be configured to analyze driving data on a basis of driver propensity for each driver ID or vehicle ID based on a learning algorithm and to determine a learned parameter for correcting output torque for each driver ID or vehicle ID.

In an exemplary embodiment of the present disclosure, the information for determining the output torque may include the output torque and the learned parameter for correcting the output torque.

In an exemplary embodiment of the present disclosure, the processor may be configured to perform integrated control by platooning a plurality of vehicles and transmitting the learned parameter and the output torque to the platooned vehicles.

An exemplary embodiment of the present disclosure provides a system including a vehicle driving control apparatus configured to generate information for determining output torque of a driving source on a basis of a driver driving propensity and a driving situation based on a learning algorithm and a server configured to collect driving data based on at least one of the driver driving propensity or the driving situation from a plurality of vehicles each of which is equipped with the vehicle driving control apparatus and to analyze the driving data, change the information for determining the output torque for each of the vehicles, and transmit it to the vehicles.

In an exemplary embodiment of the present disclosure, the vehicle control apparatus may be configured to correct output torque for driving motor torque using the information for determining the output torque received from the server.

In an exemplary embodiment of the present disclosure, the vehicle control apparatus may be configured to determine the driver driving propensity by using at least one of a driver ID and driver propensity pattern received from the mobile device, or an APS value, a BPS value, longitudinal acceleration, lateral acceleration, or a vehicle speed received from the autonomous driving control apparatus.

In an exemplary embodiment of the present disclosure, the vehicle control apparatus may be configured to predict energy to be required in the future by using at least one of a driver position pattern, driving position traffic, and driving position weather received from the mobile device, or road information, front vehicle information, a vehicle speed, and acceleration received from an autonomous driving control apparatus.

In an exemplary embodiment of the present disclosure, the server may be configured to analyze driving data on a basis of driver propensity for each driver ID or vehicle ID based on a learning algorithm and to determine a learned parameter for correcting output torque for each driver ID or vehicle ID.

In an exemplary embodiment of the present disclosure, the information for determining the output torque may include the output torque and the learned parameter for correcting the output torque.

In an exemplary embodiment of the present disclosure, the server may be configured to perform integrated control by platooning a plurality of vehicles and transmitting the learned parameter and the output torque to the platooned vehicles.

In an exemplary embodiment of the present disclosure, the vehicle control apparatus may be configured to determine a driver health condition in conjunction with a wearable device and to change vehicle driving performance according to the driver health condition.

In an exemplary embodiment of the present disclosure, it may further include a vehicle end control apparatus configured to output final output torque using the output torque received from the vehicle driving control apparatus or the learned parameters of a learning algorithm for determining the output torque.

An exemplary embodiment of the present disclosure provides a vehicle driving control method including collecting, by a server, driving data based on at least one of a driver driving propensity or a driving situation from a plurality of vehicles and changing, by the server, information for determining output torque suitable for each of the vehicles by analyzing the driving data.

In an exemplary embodiment of the present disclosure, the method may further include predicting, by a vehicle, energy to be required in the future by using a driver driving propensity and a driving situation for each driver based on a learning algorithm and determining, by the vehicle, output torque for driving a motor by using the future required energy.

In an exemplary embodiment of the present disclosure, the changing of the information for determining the output torque may include analyzing driving data on a basis of driver propensity for each driver ID or vehicle ID based on a learning algorithm and determining a learned parameter for correcting output torque for each driver ID or vehicle ID.

In an exemplary embodiment of the present disclosure, the changing of the information for determining the output torque may further include performing integrated control by platooning a plurality of vehicles and transmitting the learned parameter and the output torque to the platooned vehicles.

In an exemplary embodiment of the present disclosure, the information for determining the output torque may include the output torque and the learned parameter for correcting the output torque.

According to embodiments of the present disclosure, it may be possible to improve vehicle driving performance by collecting already learned parameters from vehicles in the cloud server and relearning AI algorithm parameters for vehicle driving based on the collected parameters.

In addition, it may be possible to perform vehicle driving control by reflecting a driver personalized characteristic in conjunction with a mobile device and an autonomous driving control apparatus and extending comprehensive computational performance of a vehicle controller without redesigning hardware of an existing vehicle controller, thereby improving driving performance of the vehicle.

Furthermore, various effects that can be directly or indirectly identified through this document may be provided.

BRIEF DESCRIPTION OF THE DRAWINGS

FIG. 9 illustrates a flowchart for describing an example vehicle driving control method.

DETAILED DESCRIPTION OF ILLUSTRATIVE EMBODIMENTS

Figure 1:
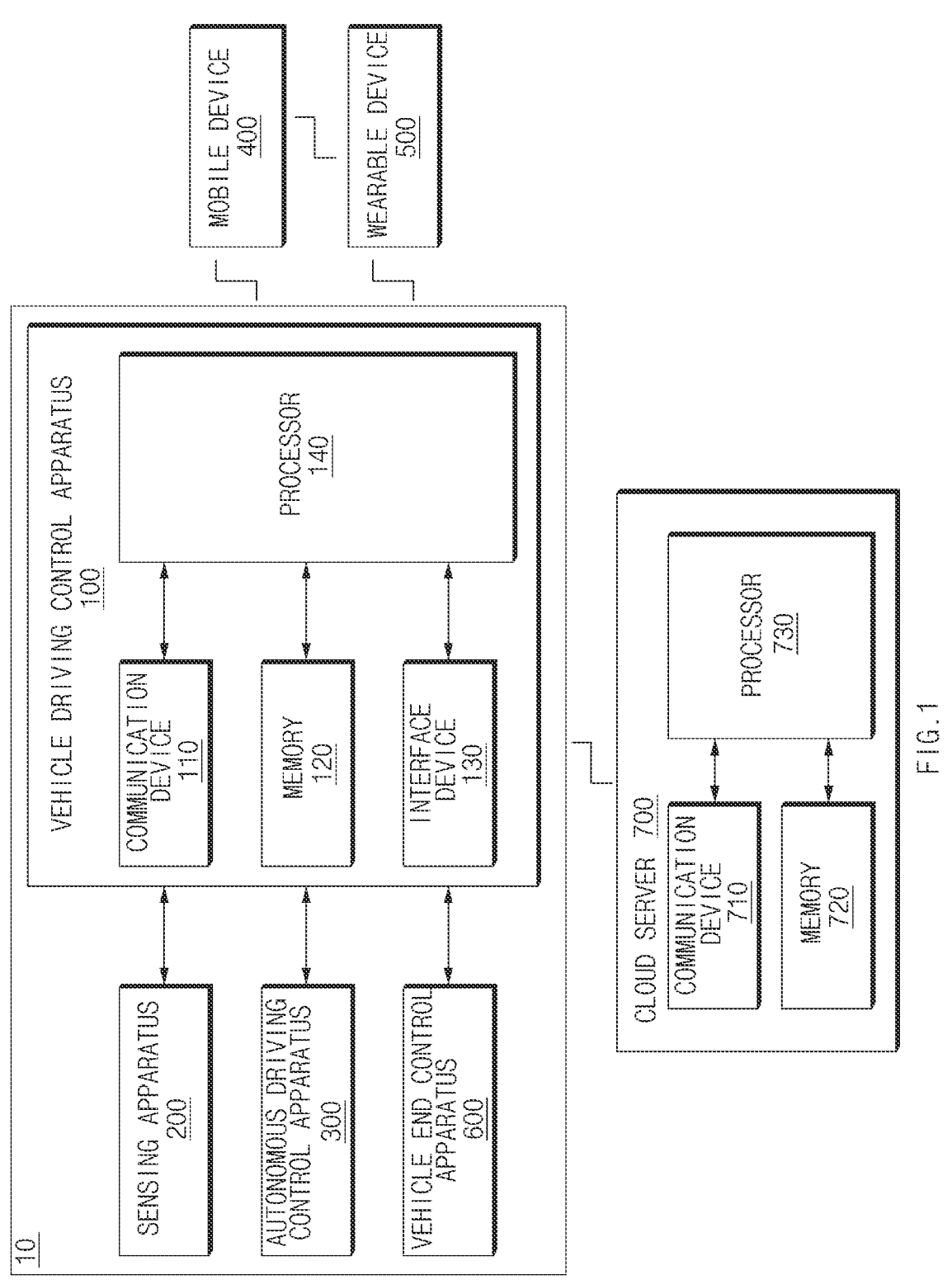
FIG. 1 illustrates a block diagram showing a configuration of an example vehicle driving control system.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which exemplary embodiments of the present disclosure pertain (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 10.

FIG. 1 illustrates a block diagram showing a configuration of an example vehicle driving control system.

Referring to FIG. 1, according to an exemplary embodiment of the present disclosure, a vehicle system may include a vehicle driving control apparatus 100, a sensing apparatus 200, an autonomous driving control apparatus 300, a mobile device 400, a wearable device 500, a vehicle end control apparatus 600, and a cloud server 700. In this case, a vehicle system 10 may include the vehicle driving control apparatus 100, the sensing apparatus 200, the autonomous driving control apparatus 300, and the vehicle end control apparatus 600, the mobile device 400 and the wearable device 500 are positioned in a vehicle when a driver gets into the vehicle, and the cloud server 700 may share driving data by communicating with the vehicle system 10 at predetermined intervals.

According to an exemplary embodiment of the present disclosure, the vehicle driving control apparatus 100 may be implemented integrally with or separately from the vehicle. In this case, the vehicle driving control apparatus 100 may be integrally formed with internal control units of the vehicle or may be implemented as a separate hardware device to be connected to control units of the vehicle by a connection means. For example, the vehicle driving control apparatus 100 may be implemented integrally with the vehicle, may be implemented in a form that is installed or attached to the vehicle as a configuration separate from the vehicle, or a part thereof may be implemented integrally with the vehicle and another part may be implemented in a form that is installed or attached to the vehicle as a configuration separate from the vehicle. For example, the vehicle driving control apparatus 100 may be implemented as a plug and play option.

The vehicle driving control apparatus 100, which is a multi-edge computing device, may determine vehicle driving torque in conjunction with the mobile device 400, the autonomous driving control apparatus 300, and the sensing apparatus 200.

The vehicle driving control apparatus 100 may predict energy required in the future by using a driver driving propensity and a driving situation for each driver based on a learning algorithm and may determine output torque for driving a motor by using energy to be required in the future.

Accordingly, the vehicle driving control apparatus 100 may determine optimal output torque for motor control by considering driver personal characteristics (e.g., an activity pattern, a health condition, driving intention, etc.) and front driving conditions (e.g., road, traffic, etc.).

The vehicle driving control apparatus 100 may include a communication device 110, a memory (i.e., a storage) 120, an interface device 130, and a processor 140.

The communication device 110 is a hardware device implemented with various electronic circuits to transmit and receive signals through a wireless or wired connection and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

In addition, the communication device 110 may perform communication with the cloud server 700 outside the vehicle through wireless Internet access or a short range communication technique. Herein, the wireless communication technique may include wireless LAN (WLAN), wireless broadband (Wibro), Wi-Fi, world interoperability for microwave access (WiMax), etc. In addition, the short-range communication technique may include Bluetooth, ZigBee, ultra wideband (UWB), radio frequency identification (RFID), infrared data association (IrDA), and the like.

The communication device 110 may perform V2X communication. The V2X communication may include communication between a vehicle and all entities such as V2V (vehicle-to-vehicle) communication which refers to communication between vehicles, V2I (vehicle to infrastructure) communication which refers to communication between a vehicle and an eNB or road side unit (RSU), V2P (vehicle-to-pedestrian) communication, which refers to communication between user equipment (UE) held by vehicles and individuals (pedestrians, cyclists, vehicle drivers, or occupants), and V2N (vehicle-to-network) communication.

As an example, the communication device 110 may communicate with the cloud server 700 to share vehicle driving data. In this case, the vehicle driving information may include output torque, parameters of a learning algorithm for determining the output torque, and the like.

The memory 120 may store sensing results of the sensing apparatus 200, data received from the autonomous driving control apparatus 300, information received from the cloud server 700, and data and/or algorithms necessary for the processor 140 to operate, etc. As an example, the memory 120 may store AI models such as a deep learning classification model, a deep learning prediction model, a deep learning determination model, and a train reinforcement learning model.

The memory 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, an optical disk, or a combination thereof.

The interface device 130 may include an input means for receiving a control command from a user and an output means for outputting an operation state of the apparatus 100 and results thereof. Herein, the input means may include a key button and may include a mouse, a joystick, a jog shuttle, a stylus pen, and the like. Furthermore, the input means may include a soft key implemented on the display.

The interface device 130 may be implemented as a head-up display (HUD), a cluster, an audio video navigation (AVN), a human machine (HM), or a human machine interface (HMI).

The output device may include a display and may also include a voice output means such as a speaker. In the instant case, when a touch sensor formed of a touch film, a touch sheet, or a touch pad is provided on the display, the display may operate as a touch screen and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

For example, the interface device 130 may display driving situation information.

The processor 140 may be electrically connected to the communication device 110, the memory 120, the interface device 130, and the like, may electrically control each component, and may be an electrical circuit that executes software commands, thereby performing various data processing and calculations described below.

The processor 140 may process a signal transferred between components of the vehicle driving control apparatus 100 and may perform overall control such that each of the components can perform its function normally. The processor 140 may be implemented in the form of hardware, software, or a combination of hardware and software, or may be, e.g., an electronic control unit (ECU), a micro controller unit (MCU), or other subcontrollers mounted in the vehicle.

The processor 140 may predict energy required in the future by using a driver driving propensity and a driving situation for each driver based on a learning algorithm and may determine output torque for driving a motor by using energy to be required in the future. In this case, the learning algorithm, which is a data-based artificial neural network control algorithm, may determine optimal output torque by learning about a variable input signal inside or outside the vehicle. To this end, the learning algorithm may include a deep learning classification model, a deep learning prediction model, a deep learning determination model, a residual reinforcement learning model, and the like.

The processor 140 may transmit a learned parameter of the learning algorithm or the output torque to the vehicle end control apparatus to determine the output torque and may receive feedback of a control result using the output torque from the vehicle end control apparatus 600.

The processor 140 may determine appropriateness of the output torque by using the fed-back control result. For example, the processor 140 may determine the appropriateness of the output torque based on a difference between the output torque and a final output torque fed back from the vehicle end control apparatus 600. The processor 140 may determine that the output torque is appropriate when the output torque and the final output torque fed back from the vehicle end control apparatus 600 match.

When it is determined that the output torque is not appropriate, the processor 140 may adjust an output torque compensation value for correcting the output torque, and may correct the output torque based on the adjusted output torque compensation value to transmit the corrected output torque to the vehicle end control apparatus 600. In this case, the output torque compensation value is a value for correcting the output torque.

The processor 140 may determine a driver driving propensity by using at least one of a driver ID and a driver propensity pattern received from a mobile device, or an accelerator position sensor (APS) value, a brake pedal sensor (BPS) value, longitudinal acceleration, lateral acceleration, or vehicle speed received from the autonomous driving control apparatus.

The processor 140 may predict energy required in the future by interworking with the mobile device 400 and the autonomous driving control apparatus 300. That is, the processor 140 may predict the energy required in the future by using at least one of a driver position pattern, driving position traffic, and driving position weather received from the mobile device 400, or road information, front vehicle information, a vehicle speed, and acceleration received from the autonomous driving control apparatus 300.

The processor 140 may interwork with the wearable device 500 to determine driver health condition and to change vehicle driving performance based on the driver health condition. For example, when the driver health condition is abnormal, the driving mode may be changed to a safe driving mode.

The processor 140 may correct the output torque using the learned parameter received from the cloud server 700 and may transmit the corrected output torque and the learned parameter to the vehicle end control apparatus 600. That is, the processor 140 may correct the output torque based on the learned parameter and may relearn the learning algorithm to transmit the learned parameter and the corrected output torque to the vehicle end control apparatus 600.

The sensing apparatus 200 may include one or more sensors that sense an obstacle, e.g., a preceding vehicle, positioned around the host vehicle and measure a distance with the obstacle and/or a relative speed thereof.

The sensing apparatus 200 may include a plurality of sensors to sense an external object of the vehicle, to obtain information related to a position of the external object, a speed of the external object, a moving direction of the external object, and/or a type of the external object (e.g., vehicles, pedestrians, bicycles, motorcycles, etc.). To this end, the sensing apparatus 200 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, etc.

The autonomous driving control apparatus 300 may transmit external driving environment information (e.g., 3D map information, path information, radar/camera/rider information, etc.) and autonomous driving information (e.g., scheduled driving speed and a future driving path) to the vehicle driving control apparatus 100.

The autonomous driving control apparatus 300 may be a device that performs autonomous driving assistance or autonomous driving control of a vehicle and may include an advanced driver assistance system (ADAS), autonomous driving (AD), smart cruise control (SCC), a highway driving assist (HDA) system, a lane following assist (LFA) system, and the like.

The mobile device 400 may collect driver behavior patterns, may recognize a driver ID, and may perform an external application program interface (API) connection. That is, the mobile device 400 may recognize driver activity patterns outside the vehicle (e.g., user walking speed, music taste, etc.), vehicle position movement patterns (e.g., frequent paths, etc.), driver schedule (e.g., driving urgency, compliance with scheduled time), etc., and may provide them to the vehicle driving control apparatus 100. In addition, the mobile device 400 may classify the driver using the driver ID and may perform personalization, shared vehicle synchronization, etc. In addition, the mobile device 400 may obtain traffic conditions, weather information, and the like on a scheduled driving path through an external API connection.

The mobile device 400 may include all portable mobile communication terminals such as a smart phone, a tablet PC, a pad, a personal digital assistant (PDA), and a laptop computer.

The wearable device 500 is a device that may be worn on a driver body and may transmit a driver health status and various driving commands to the mobile device 400. That is, the wearable device 500 may collect driver body changes (e.g., health status and behavioral pattern information such as a body temperature, a heart rate, blood sugar, steps, etc.) in real time to provide it to the mobile device 400 and may include a smart watch, a wearable band, smart glasses, and the like.

The vehicle end control apparatus 600 may be a control device for controlling a vehicle actuator, such as a motor at an end of a vehicle, a battery, etc., and may include a vehicle control unit (VCU) and the like.

The cloud server 700 may collect driving data such as optimal torque from each of a plurality of vehicles to provide optimal output torque for each vehicle type to the vehicles.

The cloud server 700 may collect driving data based on at least one of a driver driving propensity or a driving situation from the vehicles and may analyze the driving data to change information for determining output torque suitable for each of the vehicles. In this case, the information for determining the output torque may include the output torque and a learned parameter for correcting the output torque.

To this end, the cloud server 700 may include a communication device 710, a memory (i.e., a storage) 720, and a processor 730.

The communication device 710, which is a hardware device implemented with various electronic circuits to transmit and receive signals through a wireless or wired connection, may perform communication with a plurality of vehicles outside the vehicle through wireless Internet access or a short range communication technique. Herein, the wireless communication technique may include wireless LAN (WLAN), wireless broadband (Wibro), Wi-Fi, world interoperability for microwave access (WiMax), etc. In addition, the short-range communication technique may include Bluetooth, ZigBee, ultra wideband (UWB), radio frequency identification (RFID), infrared data association (IrDA), and the like.

The communication device 710 may perform V2X communication. The V2X communication may include communication between a vehicle and all entities such as V2V (vehicle-to-vehicle) communication which refers to communication between vehicles, V2I (vehicle to infrastructure) communication which refers to communication between a vehicle and an eNB or road side unit (RSU), V2P (vehicle-to-pedestrian) communication, which refers to communication between user equipment (UE) held by vehicles and individuals (pedestrians, cyclists, vehicle drivers, or occupants), and V2N (vehicle-to-network) communication.

As an example, the communication device 710 may perform communication with vehicles to collect driving data of each of the vehicles and may transmit optimal output torque and learned parameters to the individual vehicles or platooning vehicles. In this case, the vehicle driving data may include output torque, parameters of a learning algorithm for determining the output torque, and the like.

The memory 720 may store data and/or algorithms required for the processor 730 of the cloud server 700 to operate and the like. As an example, the memory 720 may store an AI model such as a learning algorithm. The memory 720 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, an optical disk, or a combination thereof.

The processor 730 may be electrically connected to the communication device 710, the memory 720, and the like, may electrically control each component, and may be an electrical circuit that executes software commands, thereby performing various data processing and calculations described below.

The processor 730 may process a signal transferred between components of the cloud server 700 and may perform overall control such that each of the components can perform its function normally. The processor 730 may be implemented in the form of hardware, software, or a combination of hardware and software, or may be, e.g., an electronic control unit (ECU), a micro controller unit (MCU), or other subcontrollers mounted in the vehicle.

The processor 730 may analyze driving data on a basis of driver propensity for each driver ID or vehicle ID based on a learning algorithm and may determine a learned parameter for correcting output torque for each driver ID or vehicle ID.

The processor 730 may share driving data including the output torque or learned parameters of the learning algorithm with vehicles to determine the output torque, may collect driving data from a plurality of vehicles, and may change a learned parameter for correcting an output torque based on the driving data of the vehicles.

In addition, the processor 140 may platoon a plurality of vehicles to simultaneously transmit the learned parameters and corrected output torque to the platooned vehicles, thereby enabling integrated control.

In an exemplary embodiment of the present disclosure, when the vehicle driving control apparatus 100 determines the output torque, compensates for the output torque, determines appropriateness of the output torque, and transmits final output torque to the vehicle end control apparatus 600, the vehicle end control apparatus 600 may control a vehicle motor by using the final output torque received from the vehicle driving control apparatus 100.

That is, in an exemplary embodiment of the present disclosure, by adding the vehicle driving control apparatus 100 to an existing vehicle, the vehicle driving control apparatus 100 may predict a driver driving propensity and future required energy based on an artificial intelligence algorithm, may calculate optimal output torque, and may provide it to the vehicle end control apparatus 600, so that the vehicle end control apparatus 600 may control the vehicle motor based on the received optimal output torque.

In addition, in an exemplary embodiment of the present disclosure, driving data such as an optimum output torque may be collected from vehicles, and the optimum output torque for each type of vehicle may be extracted and shared with the vehicles.

Figure 2:
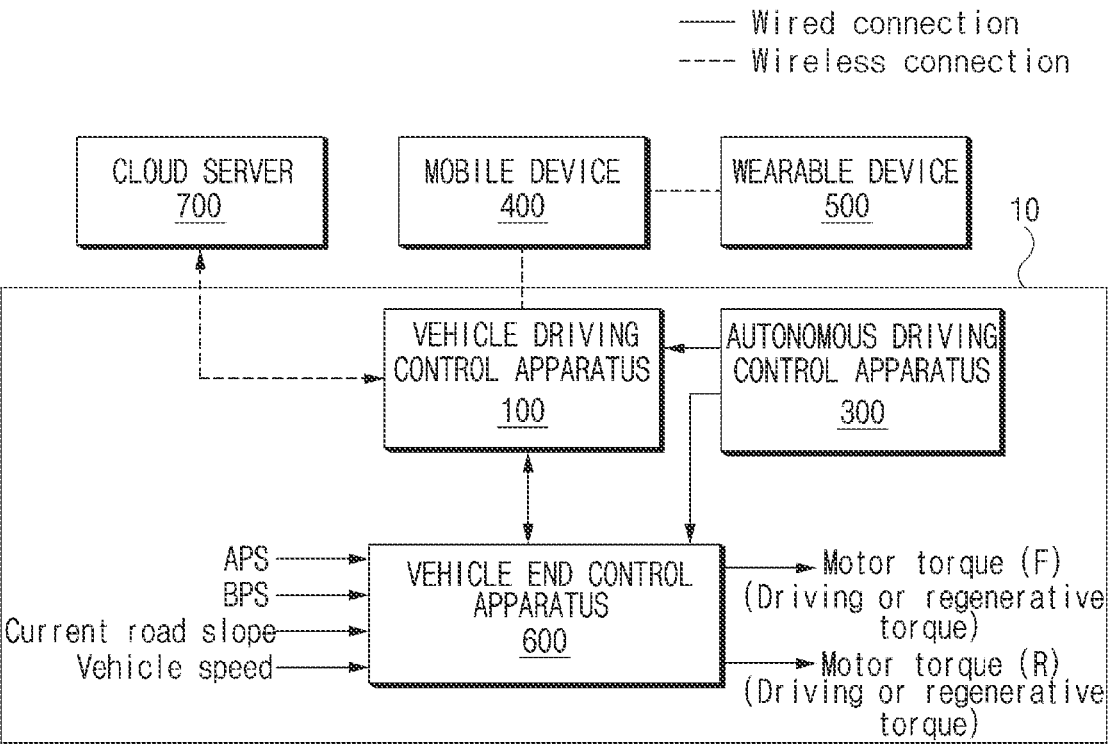
FIG. 2 illustrates an example view showing a configuration of a vehicle driving control system.
Figure 3:
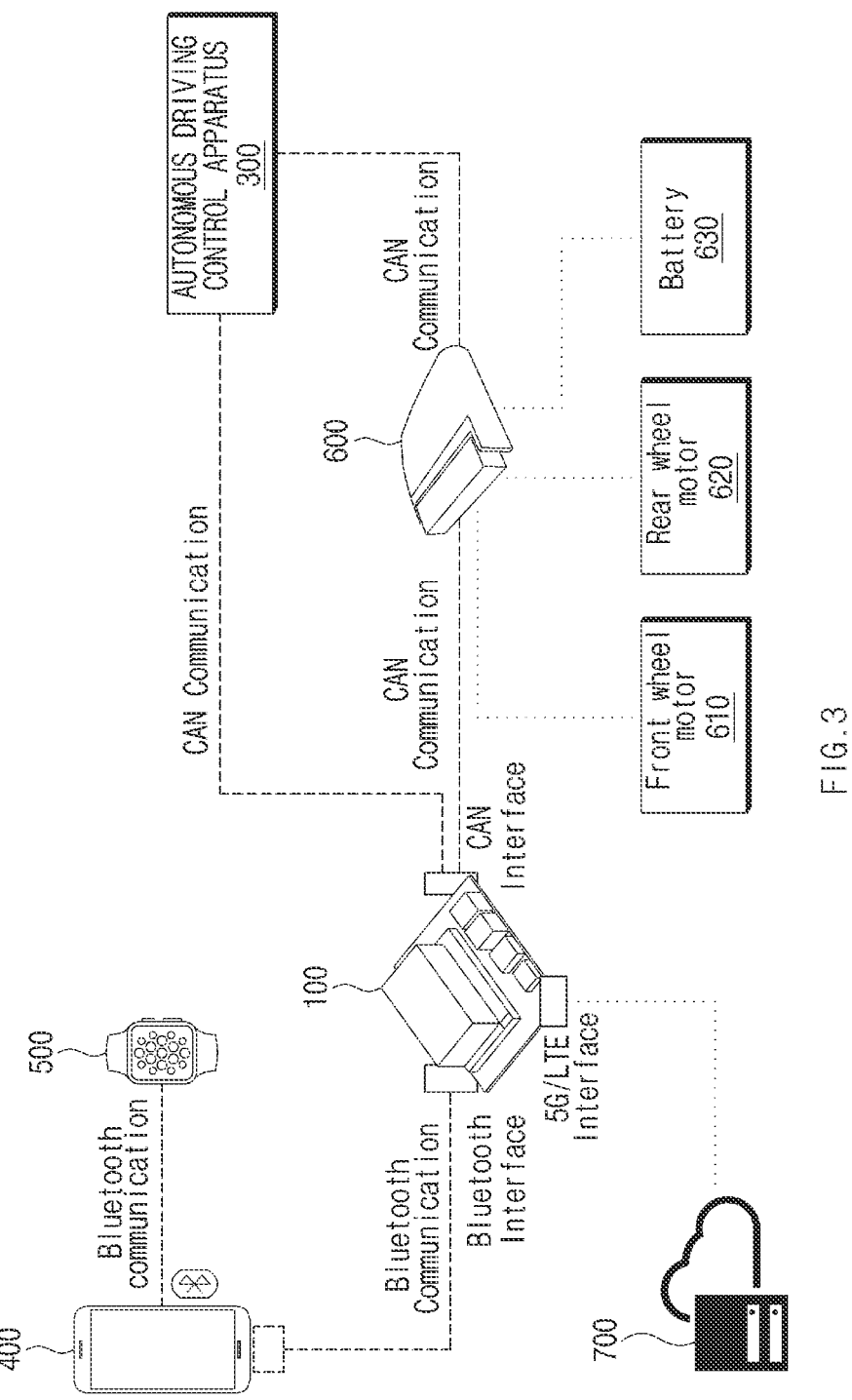
FIG. 3 illustrates a schematic diagram showing an example communication connection relationship of a system including a vehicle driving control apparatus.
Figure 4:
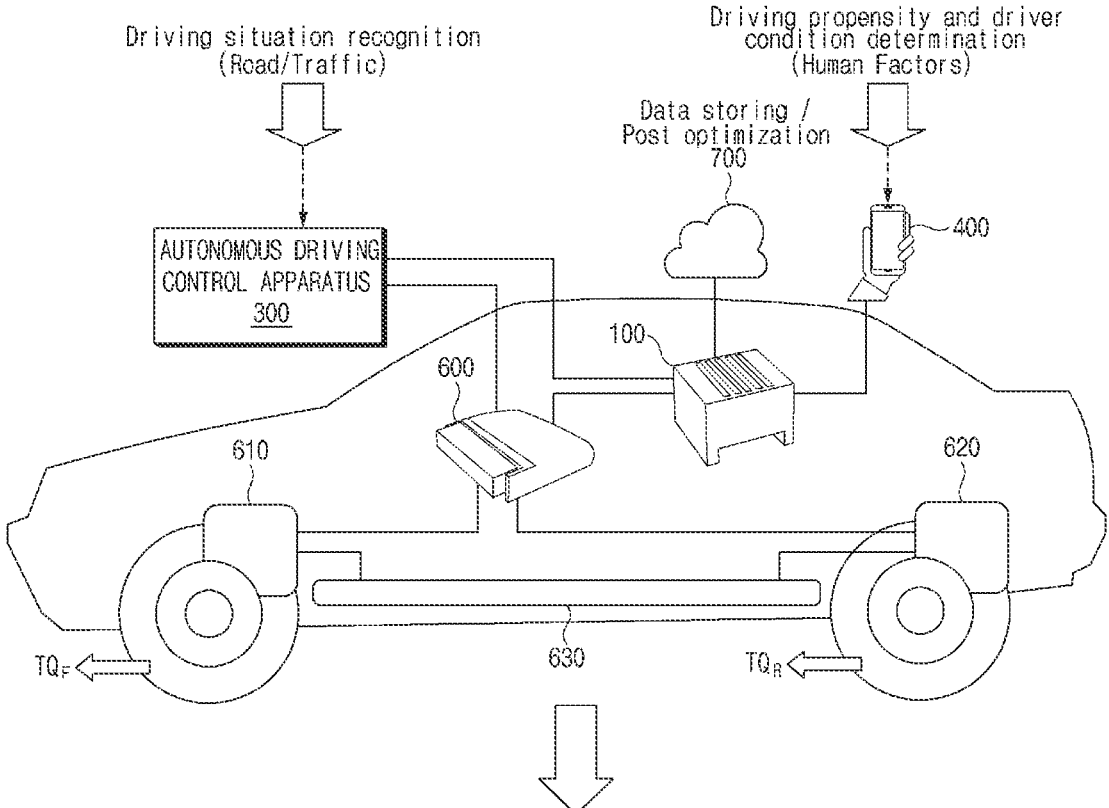
FIG. 4 illustrates an example view showing an in-vehicle configuration of a system including a vehicle driving control apparatus.

FIG. 2 to FIG. 4 illustrate schematic views showing an example of a system for vehicle driving control. FIG. 2 illustrates an example view showing a configuration of a vehicle driving control system, and FIG. 3 illustrates a schematic diagram showing an example communication connection relationship of a vehicle driving control system. FIG. 4 illustrates an example view showing an in-vehicle configuration of a vehicle driving control system.

Referring to FIG. 2, according to an exemplary embodiment of the present disclosure, the system may include the vehicle driving control apparatus 100, the autonomous driving control apparatus 300, the mobile device 400, the wearable device 500, the vehicle end control apparatus 600, and the cloud server 700.

The vehicle driving control apparatus 100 may receive driver propensity pattern information, driver position pattern information, driver schedule information, and an external API signal from the mobile device 400. In this case, the driver propensity pattern information may include a driver driving propensity (e.g., mild, sportive, normal, etc.), a driver walking speed, a driver music taste, a driver ID, etc., the driver position pattern information may include information such as a place where a driver frequently goes, the driver schedule information may include driving urgency, adherence information to scheduled time, etc., and an external application program interface (API) signal may include information such as traffic conditions and weather on the scheduled driving path.

The mobile device 400 may interwork with the wearable device 500 to acquire driver health condition information (e.g., a driver heart rate, blood sugar, number of steps, etc.) to transmit it to the vehicle driving control apparatus 100, and the wearable device 500 may configure a user interface (UI) such as voice recognition or button touch to output a driving command.

The autonomous driving control apparatus 300 may be connected to the vehicle driving control apparatus 100 and the vehicle end control apparatus 600 and may transmit information such as forward road information or traffic information, a vehicle control speed, and the like to the vehicle driving control apparatus 100. In this case, the information obtained from the autonomous driving control apparatus 300 may include 3D map information, path information, radar information, camera information, rider information, a scheduled driving speed, a future driving path, and the like.

The vehicle driving control apparatus 100 may classify the driver driving propensity and predict future required energy by using the information received from the mobile device 400 and the autonomous driving control apparatus 300. In this case, the future required energy may refer to an amount of energy predicted to be required when driving to a destination.

The vehicle driving control apparatus 100 may determine the driver driving propensity based on an AI model and may determine the optimal output torque by predicting the future required energy.

The vehicle driving control apparatus 100 may transmit the optimum output torque to the vehicle end control apparatus 600.

The vehicle end control apparatus 600 may vary the optimal output torque of the vehicle driving control apparatus 100 based on a large amount of variable input signals inside and outside the vehicle, such as an accelerator position sensor (APS) value, a brake pedal sensor (BPS) value, a current road slope, a vehicle speed, etc. In this case, the vehicle end control apparatus 600 may output motor torque that is optimal for each driver condition through the vehicle driving control apparatus 100 without a map table tuned by a human through an artificial neural network control algorithm.

The vehicle end control apparatus 600 may output motor torque and the like to perform end control of an actuator, a motor, a battery, and the like of a vehicle.

The vehicle end control apparatus 600 may output final motor torque by using a reinforcement learning inference model. In this case, the vehicle end control apparatus 600 may use a learned parameter received from the vehicle driving control apparatus 100 when learning a reinforcement learning inference model.

In addition, the vehicle end control apparatus 600 may output final motor torque to control the motor and then may feed back a control result to the vehicle driving control apparatus 100.

The cloud server 700 may perform large capacity calculation for vehicle driving to provide a result thereof to vehicle driving control apparatuses of vehicles. The cloud server 700 may be communicatively connected to the vehicle driving apparatuses mounted on the respective vehicles, may share driving data for AI model learning, and may platoon vehicles driving in a nearby area into clusters to transmit an integrated driving command thereto.

Referring to FIG. 3, the mobile device 400 and the wearable device 500 may perform communication through Bluetooth communication, and the mobile device 400 and the vehicle driving control apparatus 100 may also perform communication based on Bluetooth communication.

The vehicle driving control apparatus 100, the vehicle end control apparatus 600, the autonomous driving control apparatus 300, a front wheel motor 610, a rear wheel motor 620, and a battery 630 may perform communication based on CAN communication.

Referring to FIG. 4, the autonomous driving control apparatus 300 may recognize a driving situation to transmit driving situation information to the vehicle driving control apparatus 100 and the vehicle end control apparatus 600. The mobile device 400 may determine a driver driving propensity and a driver condition to transmit them to the vehicle driving control apparatus 100.

The vehicle driving control apparatus 100 may determine output torque based on the driver driving propensity, the driver condition, the driving situation information, etc., and may transmit the output torque and learned parameters to the vehicle end control apparatus 600.

The vehicle end control apparatus 600 may determine and output optimum torque for driving the front wheel motor 610 and the rear wheel motor 620 based on the output torque and the learned parameters received from the vehicle driving control apparatus 100.

TABLE 1

|  | State | Front wheel motor torque TQ | Rear wheel motor torque TQ |
|---|---|---|---|
| Ddriver | Mild | — | Powered |
|  | Normal | Assist | Powered |
|  | Sportive | Powered | Powered |
| Road | Downhill | Regen | Powered |
|  | Flat | — | Powered |
|  | Uphill | Powered | Powered |
|  | Snowy | Powered | Assist |

As shown in Table 1, the vehicle end control apparatus 600 may determine torques of the front wheel motor and the rear wheel motor based on various driver tendencies and road conditions.

In addition, the vehicle end control apparatus 600 may further reflect road curvature, traffic conditions, coasting, braking, off-road, and the like to determine the torques of the front and rear wheel motors.

In addition, the vehicle driving control apparatus 100 may perform 5G/LTE communication with the cloud server 700.

As such, according to an exemplary embodiment of the present disclosure, the vehicle driving control apparatus 100 may predict the future required energy based on the driver driving propensity, the future driving condition, etc., may learn the parameters for determining the torque required for driving the motor to transmit the learned parameters to the vehicle end control apparatus 600, and may learn an AI algorithm by receiving feedback of a control result thereof.

In addition, according to an exemplary embodiment of the present disclosure, a separate cloud server 700 may analyze learned parameters shared by a plurality of vehicles to determine an optimal torque learning compensation value, may reflect the optimal torque learning compensation value to the AI algorithm to relearn it and output an optimal learned parameter, and may transmit the parameter, relearned after applying the optimal torque compensation value to the vehicle, to determine the optimal torque.

As such, the vehicle driving control apparatus 100 may learn parameters for torque determination based on the AI algorithm to help the vehicle end control apparatus 600 to calculate the optimal torque based on a driver propensity, a driving situation, driving data of a same vehicle type, and the like.

In addition, according to an exemplary embodiment of the present disclosure, additional learning of parameters of the AI model of the vehicle driving control apparatus 100 may be possible through post-learning by collecting parameters already learned by a plurality of vehicles through the cloud server 700, and autonomous driving control apparatuses of the vehicles may be simultaneously connected to each other to simultaneously collect driving data of the vehicles to perform integrated learning, and thus integrated control is possible.

In addition, according to an exemplary embodiment of the present disclosure, data of multiple vehicles learned in a similar driving environment in a nearby area may be mutually shared to relearn learned parameters of a host vehicle through the cloud server 700, and thus an AI model installed in the host vehicle may make collective intelligence determinations, and AI model performance of connected vehicles in nearby areas may be improved at a same time.

Therefore, according to an exemplary embodiment of the present disclosure, it may be possible to achieve 'personalization' reflecting driver differentiated behavioral characteristics, 'optimization of power (energy)' reflecting road and traffic conditions, 'driving integration' through joint control with surrounding vehicles, 'safety' that predicts and responds to driver health or future unexpected situations, etc.

Figure 5:
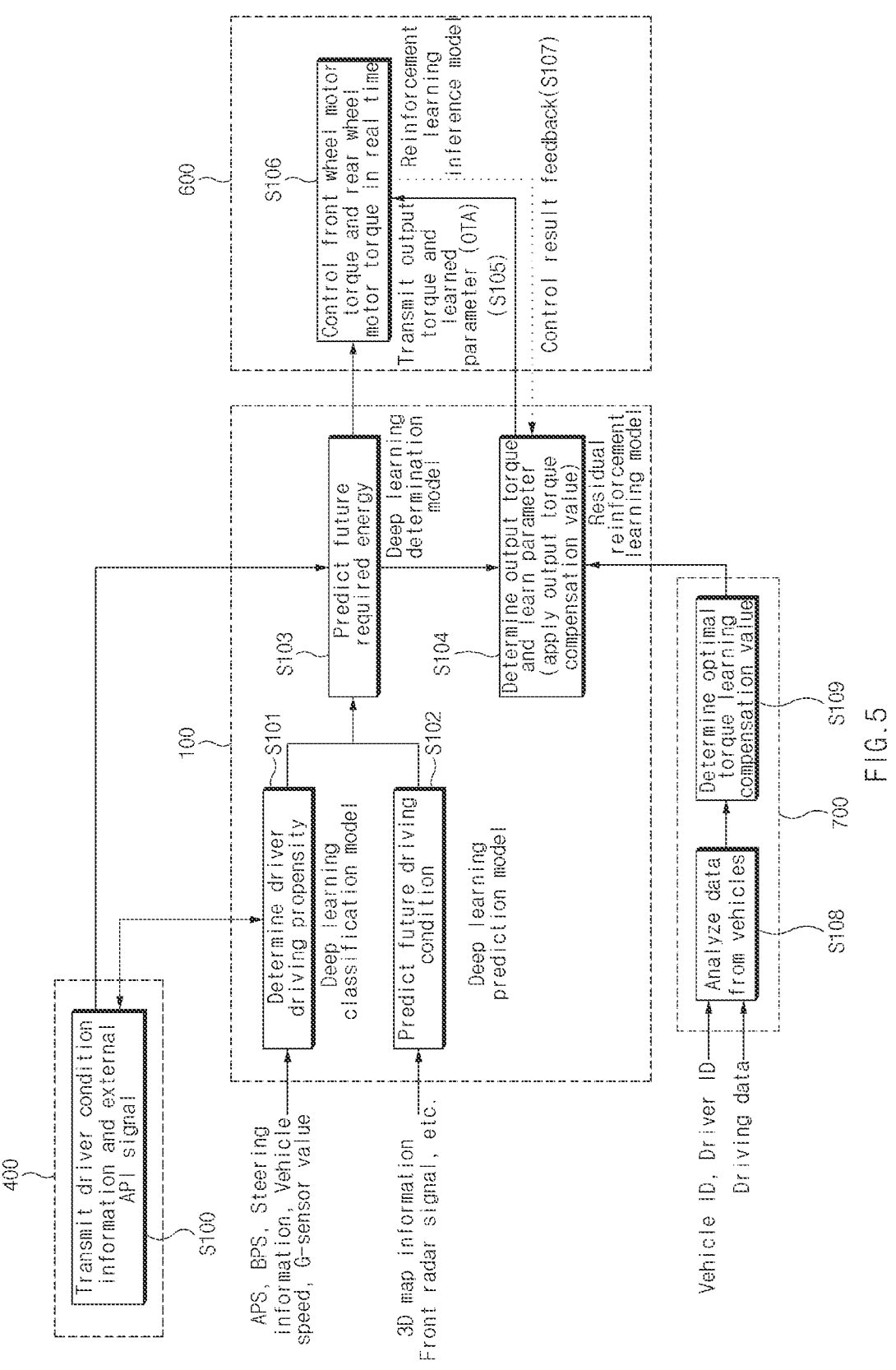
FIG. 5 illustrates a flowchart for describing an example vehicle driving control process.

FIG. 5 illustrates a flowchart for describing an example vehicle driving control process.

Referring to FIG. 5, the mobile device 400 may transmit driver condition information and an external API signal to the vehicle driving control apparatus 100 (S100).

The vehicle driving control apparatus 100 may determine a driver driving propensity by using driving data such as an APS value, a BPS value, steering, a vehicle speed, and a G sensor value (S101). In this case, the vehicle driving control apparatus 100 may determine the driver driving propensity by using a deep learning classification model based on a deep learning algorithm.

In addition, the vehicle driving control apparatus 100 may predict future driving conditions based on information such as 3D map information and forward radar signals received from the autonomous driving control apparatus 300 (S102). In this case, the vehicle driving control apparatus 100 may predict the future driving conditions by using a deep learning prediction model based on a deep learning algorithm.

The vehicle driving control apparatus 100 may predict future required energy by using a driver driving propensity determination result and a future driving condition prediction result (S103). In this case, the vehicle driving control apparatus 100 may predict the future required energy by using a deep learning determination model based on a deep learning algorithm.

In addition, the vehicle driving control apparatus 100 may determine output torque using a result of predicting future required energy and may learn parameters necessary for calculating the output torque (S104). In this case, the vehicle driving control apparatus 100 may learn parameters using a residual reinforcement learning model based on a deep learning algorithm. That is, the vehicle driving control apparatus 100 may learn an output torque compensation value for correcting the output torque by using a difference between the output torque transmitted to the vehicle end control apparatus 600 and a control result fed back from the vehicle end control apparatus 600 and may transmit the learned parameters to the vehicle end control apparatus 600 (S105). Herein, the parameter may include parameters of AI models such as the deep learning classification model, the deep learning prediction model, the deep learning determination model, and the reinforcement learning inference model of the vehicle end control apparatus 600. As such, the performance of the AI model may be improved at the same time by continuing to learn the parameters.

The vehicle end control apparatus 600 may output front wheel motor torque and rear wheel motor torque in real time based on the output torque and the learned parameter from the vehicle driving control apparatus 100 (S106). In this case, the vehicle end control apparatus 600 may calculate the front wheel motor torque and the rear wheel motor torque by reflecting the learned parameters received from the vehicle driving control apparatus 100 to the reinforcement learning inference model. Subsequently, the vehicle end control apparatus 600 may control the front wheel motor and the rear wheel motor using the calculated front and rear wheel motor torques and may feed back the control result to the vehicle driving control apparatus 100 (S107).

Accordingly, the vehicle driving control apparatus 100 may learn an output torque compensation value for output torque correction using the fed-back result based on the residual reinforcement learning model and may transmit the learned parameters to the vehicle end control apparatus 600.

Therefore, the vehicle end control apparatus 600 may improve acceleration/deceleration performance customized for each driver ID and may optimally control the front wheel motor and the rear wheel motor.

In addition, the cloud server 700 may analyze driving data collected from the vehicles based on driving data collected from the vehicles (parameters learned from nearby vehicles, etc.) and vehicle ID or driver ID information (S108) and may determine an optimal torque learning compensation value (S109).

Figure 6:
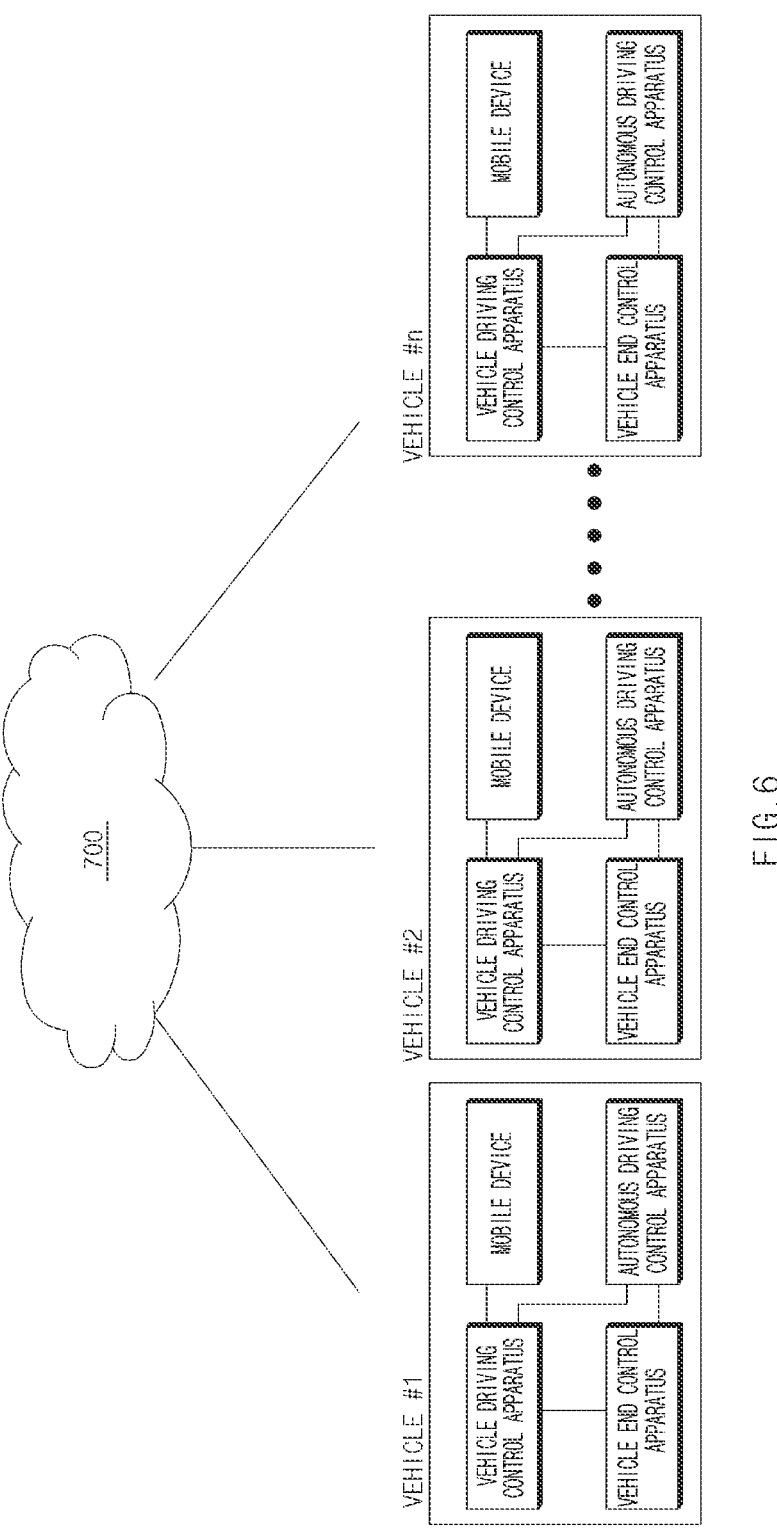
FIG. 6 illustrates an example relationship between a cloud server and a plurality of vehicles.

FIG. 6 illustrates an example relationship between the cloud server 700 and a plurality of vehicles vehicle #1, vehicle #2, . . . , and vehicle #n.

V2X communication is performed with the cloud server 700 and the vehicles vehicle #1, vehicle #2, . . . , and vehicle #n, and driving information (e.g., optimal torque information) of each of the vehicles may be mutually shared. In this case, the vehicles vehicle #1, vehicle #2, . . . , and vehicle #n may be equipped with the vehicle driving control apparatus 100, the vehicle end control apparatus 600, the autonomous driving control apparatus 300, and the mobile device 400 of FIG. 1 and may share control parameters and information for optimal driving strategies through V2X communication.

Figure 7:
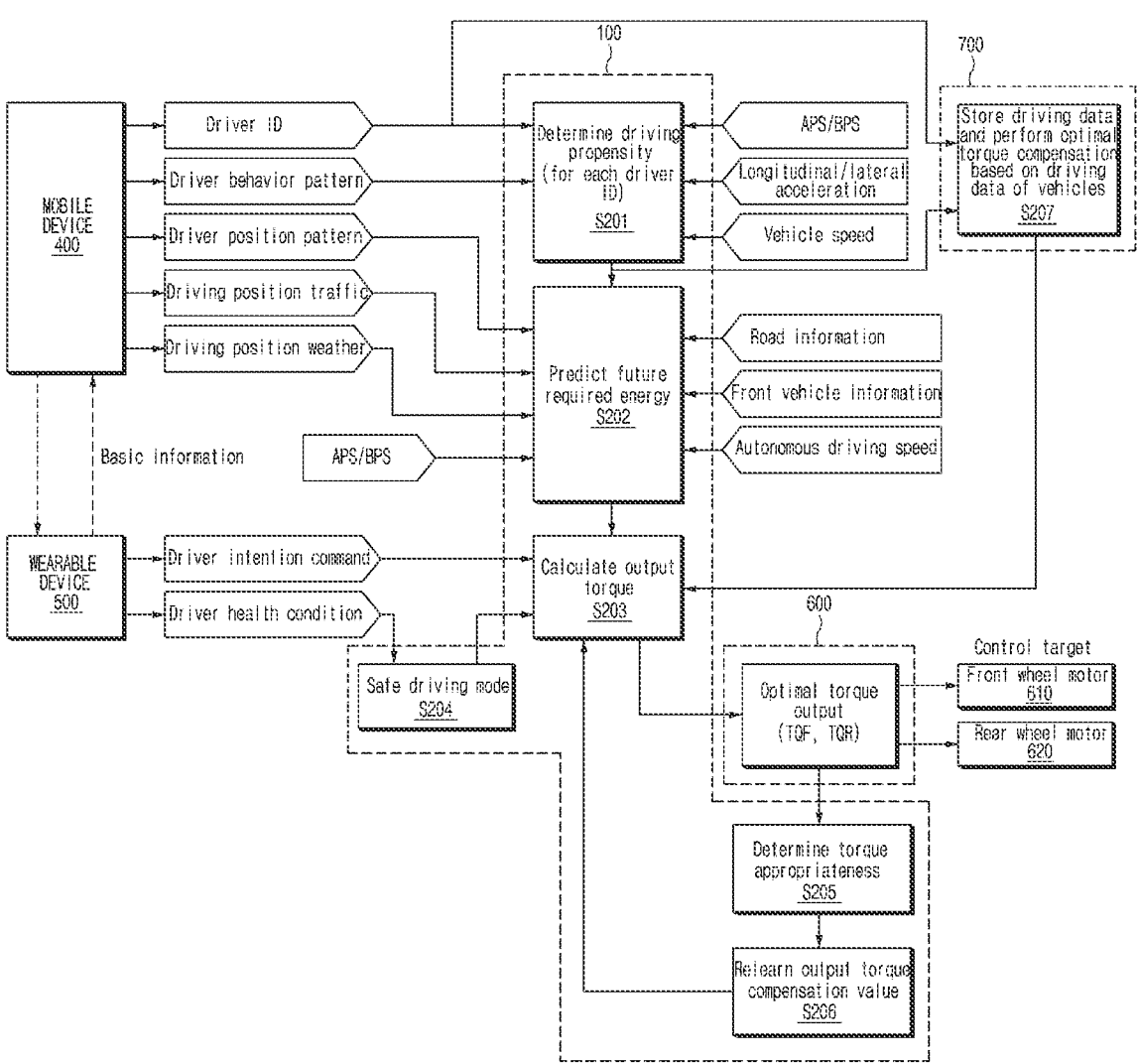
FIG. 7 illustrates a flowchart showing an example vehicle driving control process.

FIG. 7 illustrates a flowchart showing an example vehicle driving control process.

Referring to FIG. 7, the vehicle driving control apparatus 100 may use driver IDs and driver behavior patterns received from the mobile device 400 and accelerator position sensor (APS) value/brake pedal sensor (BPS) value, longitudinal/lateral acceleration, a vehicle speed, etc. received from an in-vehicle device to determine a driver driving propensity for each of the driver IDs (S201).

That is, the vehicle driving control apparatus 100 may predict future required energy by using driver position patterns, traffic at a driving position, and weather at the driving position received from the mobile device 400, APS/ BPS, and road information, front vehicle information, autonomous driving speed, etc. received from the autonomous driving control apparatus 300, etc.

Subsequently, the vehicle driving control apparatus 100 may calculate output torque based on a driver driving propensity determination result and a future required energy prediction result, a driver-intended command received from the wearable device 500, and a driver health condition (S203).

In this case, the vehicle driving control apparatus 100 may determine whether a safe driving mode is operated based on a health condition of a driver received from the wearable device 500 and may reflect whether the safe driving mode is operated when calculating the output torque. That is, the vehicle driving control apparatus 100 may operate in the safe driving mode when the driver health condition is abnormal (S204).

The vehicle driving control apparatus 100 may transmit the calculated output torque to the vehicle end control apparatus 600, and the vehicle end control apparatus 600 may output the optimal output torque for controlling the front wheel motor 610 and the rear wheel motor 620 based on the output torque and may feed back a control result thereof to the vehicle driving control apparatus 100.

Accordingly, the vehicle driving control apparatus 100 may determine appropriateness of the output torque outputted in the step S203 using feedback information received from the vehicle end control apparatus 600 (S205), and when the output torque is appropriate, may relearn the output torque compensation value (S206) and may recalculate the output torque. In this case, the vehicle driving control apparatus 100 may determine that the output torque calculated in step S203 is appropriate when the output torque outputted to the vehicle end control apparatus 600 in step S203 and a result (final output torque) fed back from the vehicle end control apparatus 600 match, may relearn the output torque compensation value for correcting the output torque using a difference between the output torque outputted to the vehicle end control apparatus 600 in step S203 and a result (final output torque) fed back from the vehicle end control apparatus 600, and may correct the output torque calculated in step S203 using the relearned output torque compensation value when they don't match.

The cloud server 700 may communicate with a plurality of vehicles, may store driving data received from the vehicles, may perform optimal torque compensation based on the driving data of the vehicles, and may share the learned parameters to which the optimal torque compensation is applied (S207). The cloud server 700 may determine the output torque for each driver ID or vehicle ID in consideration of the driver propensity for each driver ID or vehicle ID and may determine the optimal output torque. For example, the cloud server 700 may derive optimal output torque for different driver propensity, vehicle type, etc., based on driving data received from the vehicles. Accordingly, the vehicle driving control apparatus 100 of the vehicle may compensate for the output torque of the host vehicle by using the optimal output torque received from the cloud server 700, by transmitting the optimal output torque to the vehicle.

As such, in an exemplary embodiment of the present disclosure, it may be possible to improve control performance of the vehicle by adding the vehicle driving control apparatus 100 into the vehicle as an edge computer without changing software (legacy code) of existing controllers, using the vehicle driving control apparatus 100 without improving computing performance of the existing controllers, and predicting the driver propensity in the vehicle and determining the future required energy.

In addition, in an exemplary embodiment of the present disclosure, the optimum output torque may be compensated and the compensated optimum output torque may be shared with vehicles by mounting such a vehicle driving control apparatus 100 and collecting driving data (optimal output torque, learned parameters, etc.) from vehicles that have determined the optimal output torque.

In addition, in an exemplary embodiment of the present disclosure, it may be easy to collect information for determining the driver propensity by determining the driver propensity using the mobile device 400 that the driver always carries, it may be possible to easily collect driver health condition, etc. by additionally using the wearable device 500, etc., and it may be easy to change driving performance, such as a safe driving mode, based on such driver condition information.

Figure 8:
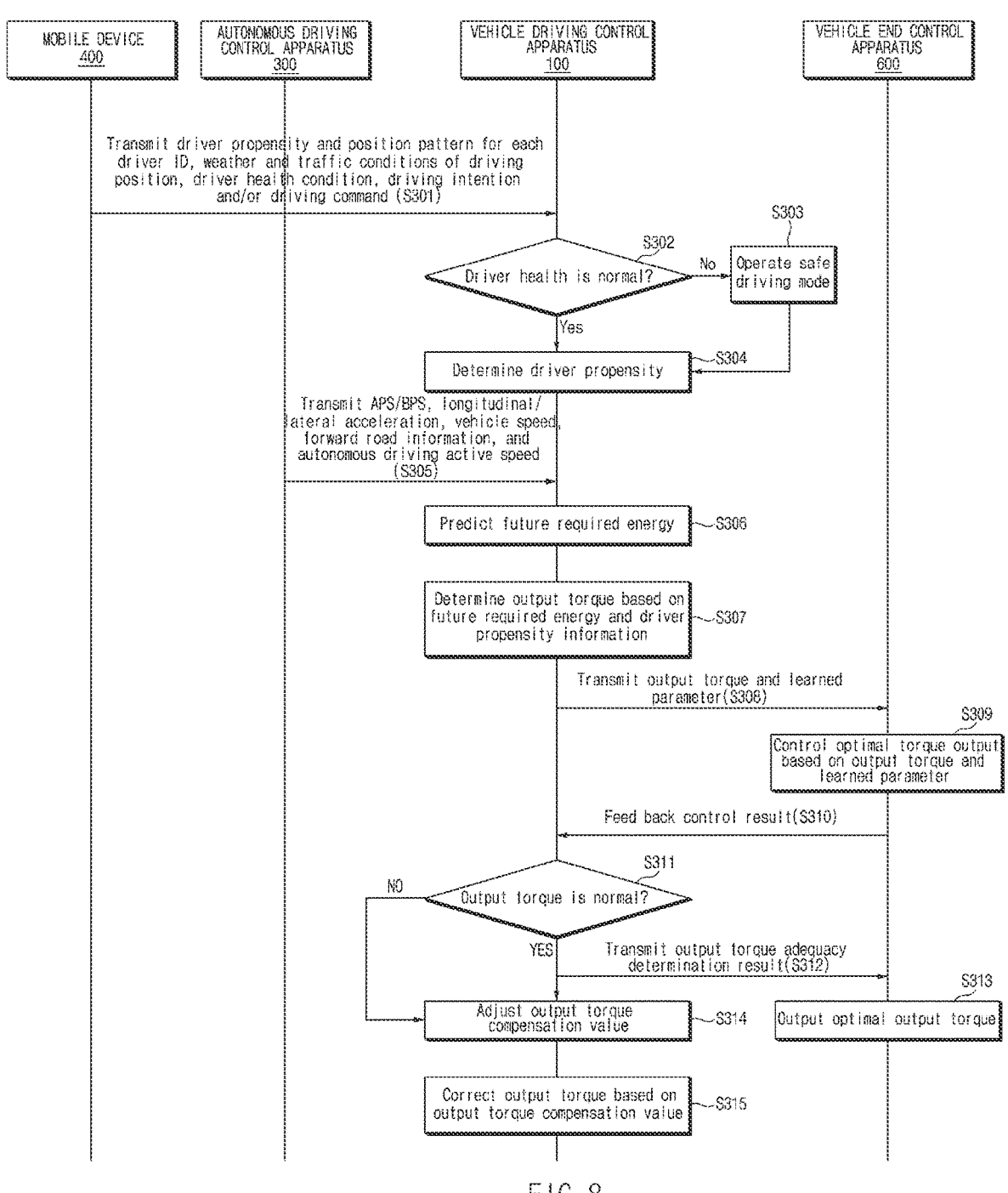
FIG. 8 illustrates an example vehicle driving control method.

Hereinafter, a vehicle driving control method for a vehicle according to an exemplary embodiment of the present disclosure will be described in detail with reference to FIG. 8 and FIG. 9. FIG. 8 and FIG. 9 each illustrate a flowchart for describing an example vehicle driving control method.

Hereinafter, it may be assumed that the vehicle driving control apparatus 100 of FIG. 1 performs the process of FIG. 8 in conjunction with the autonomous driving control apparatus 300, the mobile device 400, and the vehicle end control apparatus 600. In the description of FIG. 8, operations described as being performed by a device may be understood as being controlled by the processor 140 of the vehicle driving control apparatus 100.

Referring to FIG. 8, the vehicle driving control apparatus 100 may receive driver propensity and a position pattern for each driver ID, weather and traffic conditions of a driving position, a driver health condition, driving intention and/or a driving command from the mobile device 400 (S301). The mobile device 400 may determine the driver health condition through interworking with the wearable device 500.

The vehicle driving control apparatus 100 may determine whether the driver health condition is normal based on driver health condition information received from the mobile device 400 (S302), and when there is a problem with the driver health condition, the safe driving mode is entered (S303).

On the other hand, when there is no problem with the driver health condition, the vehicle driving control apparatus 100 may determine the driver driving propensity based on the driver propensity and the position pattern for each driver ID received from the mobile device 400, the driving position, and the traffic condition (S304). In this case, the driver driving propensity may be classified into mild, which drives slowly and smoothly, sportive, which mainly performs sudden acceleration, braking, and speeding, and normal, which is a driving style within a normal range, etc.

Subsequently, the vehicle driving control apparatus 100 may receive APS/BPS, longitudinal/lateral acceleration, a vehicle speed, forward road information, front vehicle information, an autonomous driving active speed, and the like from the autonomous driving control apparatus 300 (S305). In this case, the forward road information may include curvature of a road ahead, road condition information, and the like, and the front vehicle information may include a speed of a front vehicle.

The vehicle driving control apparatus 100 may predict future required energy by using a driver propensity determination result and front road information, front vehicle information, a vehicle speed, acceleration, APS/BPS, a driver position pattern, driving position traffic, driving position weather, etc. (S306).

The vehicle driving control apparatus 100 may determine the output torque using driver propensity information and the future required energy prediction result (S307) and may transmit the output torque and learned parameters to the vehicle end control apparatus 600 (S308). In this case, the learned parameters include the learned parameter of the AI model driven to determine the output torque.

The vehicle end control apparatus 600 may output final output torque for a driving source such as a motor or an engine by using the output torque and the learned parameters received from the vehicle driving control apparatus 100 (S309).

Subsequently, the vehicle end control apparatus 600 may feed back a motor control result based on the final output torque to the vehicle driving control apparatus 100 (S310).

The vehicle driving control apparatus 100 may determine whether the output torque is appropriate based on the feedback result (final output torque) received from the vehicle end control apparatus 600 (S311). That is, the vehicle driving control apparatus 100 may compare the output torque calculated in step S307 with the feedback result received from the vehicle end control apparatus 600 and may determine that the corresponding output torque is appropriate when they match.

When it is determined that the output torque is appropriate, the vehicle driving control apparatus 100 may transmit an output torque adequacy determination result to the vehicle end control apparatus 600 (S312), and the vehicle end control apparatus 600 may control a motor by using the corresponding final output torque (S313).

On the other hand, when it is determined that the output torque is not appropriate, the vehicle driving control apparatus 100 may adjust an output torque compensation value by using a difference between the output torque calculated in S307 and the feedback result received from the vehicle end control apparatus 600 (S314).

Subsequently, the vehicle driving control apparatus 100 may correct the output torque calculated in S307 based on the output torque compensation value (S315) and may repeatedly perform steps S308 to S315 thereafter.

Hereinafter, it is assumed that the cloud server 700 of FIG. 1 performs the process of FIG. 9 in conjunction with the vehicle driving control apparatus 100.

The cloud server 700 may collect driving data from vehicles (S401). The driving data may include output torque for each vehicle type, an output torque compensation value, learned parameters, etc.

The cloud server 700 may analyze the driving data collected from the vehicles (S402). That is, the optimal output torque and learned parameters may be determined by extracting output torque and learned parameters for each vehicle ID or driver ID and analyzing driving results.

Subsequently, the cloud server 700 may change a learned parameter (e.g., an output torque compensation value) for correcting output torque based on the analyzed driving data (S403). In this case, the learned parameter, which is a parameter used in an AI algorithm, may be changed through learning.

The cloud server 700 may transmit the changed learned parameter to a vehicle, and the vehicle driving control apparatus 100 of the vehicle may correct the output torque based on the changed learned parameter (S404). That is, the cloud server 700 may aggregate data of individual vehicles to establish an optimal driving strategy, may transmit a result thereof to individual vehicles, and may platoon individual vehicles to perform integrated control.

The vehicle driving control apparatus 100 may transmit the corrected output torque and parameters to the vehicle end control apparatus 600 (S405).

That is, the cloud server 700 may apply the optimal torque learning compensation value and learn the AI algorithm to correct the output torque and may transmit the corrected output torque and the relearned learned parameter to the vehicles by applying the optimal torque learning compensation value.

As such, in an exemplary embodiment of the present disclosure, computational performance for vehicle driving control may be expanded in conjunction with the mobile device 400 and the autonomous driving control apparatus 300 by newly adding only the vehicle driving control apparatus 100 in a state where hardware calculation performance of the vehicle end control apparatus 600 is maintained. As such, according to an exemplary embodiment of the present disclosure, it may be possible to improve driving performance and personalized characteristics of the vehicle while minimizing the change of the existing controller.

That is, according to an exemplary embodiment of the present disclosure, as the vehicle driving control apparatus 100 installed in the vehicle receives driver personal characteristics (an activity pattern, a health condition, driving intention, etc.) recognized from a mobile device (smart phone, smart watch, etc.) that a customer carries on a daily basis and receives a forward driving condition (road/traffic, etc.) from the autonomous driving control apparatus 300, it may be possible to improve control performance of the vehicle by obtaining an optimal calculation result for motor torque calculation based on a high-performance AI algorithm and then transmitting it to the vehicle end control apparatus 600. Accordingly, the vehicle driving control apparatus 100 according to an exemplary embodiment of the present disclosure may be mounted in the vehicle to ensure real-time analysis, and to this end, the vehicle driving control apparatus 100 may be implemented with low power and be miniaturized and may not be replaced with a cloud device that may cause communication delay.

In addition, the vehicle end control apparatus 600 according to an exemplary embodiment of the present disclosure may not determine a motor torque using an existing map table or the like but may determine final motor torque by receiving the learned parameters reflected by analyzing the driving propensity, driving condition, and driving data of vehicles of the same model in real time by the vehicle driving control apparatus 100 to enable personalized information reflecting the driver differentiated behavioral characteristics and optimal torque reflecting optimal energy reflecting driving road and traffic conditions to be calculated.

In addition, the vehicle driving control apparatus 100 according to an exemplary embodiment of the present disclosure may determine the driver driving propensity, calculate future required energy, and determine optimum output torque, may transmit driving data such as the determined output torque to the cloud server 700, may comprehensively analyze an optimal driving strategy of a plurality of vehicles in the cloud server 700 and establish the optimal driving strategy in units of sections, and may transmit and share the optimal driving strategy to the vehicles.

As such, according to an exemplary embodiment of the present disclosure, it may be possible to improve post-learning completeness by sharing learned parameters of the vehicles through communication between the cloud server 700 and the vehicle. That is, it may be possible to collect and analyze driving data determined by the cloud server 700 and the vehicle driving control apparatus 100 for each individual vehicle, determine the optimal output torque, and share it with the vehicles, and global optimization may be performed by platooning a plurality of vehicles and transmitting an integrated driving command.

Figure 10:
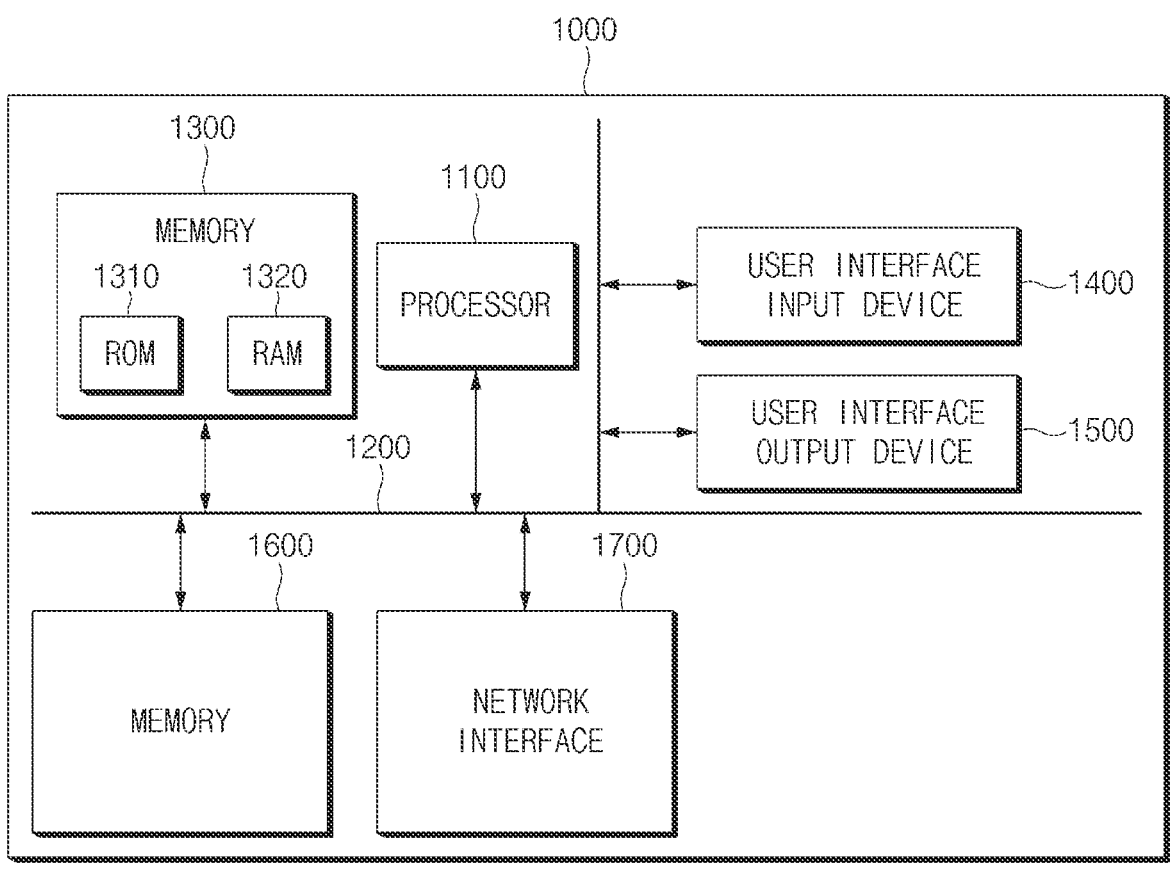
FIG. 10 illustrates an example computing system.

FIG. 10 illustrates an example computing system.

Referring to FIG. 10, a computing system 1000 includes at least one processor 1100 connected through a bus 1200, a memory 1300, a user interface input device 1400, a user interface output device 1500, a memory (i.e., a storage) 1600, and a network interface 1700.

The processor 1100 may be a central processing unit (CPU) or a semiconductor device that performs processing on commands stored in the memory 1300 and/or the memory 1600. The memory 1300 and the memory 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the memory 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical ideas of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A server comprising:

a processor configured to:

collect driving data based on a driver driving propensity and a driving situation from a plurality of vehicles; and change information for determining an output torque suitable for each of the plurality of vehicles by analyzing the driving data; and a communication device configured to transmit the changed information for determining the output torque to the plurality of vehicles by communicating with the plurality of vehicles, wherein the processor is further configured to:

interwork with a wearable device to determine a driver health condition;

change vehicle driving performance based on the driver health condition;

analyze a plurality of learned parameters shared by the plurality of vehicles to determine an optimal torque learning compensation value;

predict future energy required by using the driver driving propensity and the driving situation for each driver based on a learning algorithm;

determine the output torque for driving a motor by using the future energy required; and determine an appropriateness of the output torque based on a difference between the output torque and a final output torque fed back from a vehicle end control apparatus, and wherein the wearable device is configured to:

transmit a driver health status and various driving commands to a mobile device; and collect driver body changes to provide the driver body changes to the mobile device, and include a smart watch, a wearable band, and smart glasses.

2. The server of claim 1, wherein the processor is further configured to:

analyze additional driving data based on a driver propensity for each driver ID of a plurality of driver IDs or each vehicle ID of a plurality of vehicle IDs based on the learning algorithm; and determine a learned parameter for correcting the output torque for each driver ID or vehicle ID.

3. The server of claim 2, wherein the information for determining the output torque comprises the output torque and the learned parameter for correcting the output torque.

4. The server of claim 3, wherein the processor is further configured to:

perform integrated control by platooning the plurality of vehicles and transmitting the learned parameter and the output torque to the platooned plurality of vehicles.

5. A system comprising:

a vehicle driving control apparatus configured to generate information for determining an output torque of a driving source based on a driver driving propensity and a driving situation based on a learning algorithm; and a server configured to:

collect driving data based on the driver driving propensity and the driving situation from a plurality of vehicles each of which is equipped with the vehicle driving control apparatus;

analyze the driving data;

change the information for determining the output torque for each of the vehicles; and transmit the changed information for determining the output torque to the vehicles, wherein the vehicle driving control apparatus is further configured to:

be implemented as a plug and play option;

determine vehicle driving torque in conjunction with a mobile device, an autonomous driving control apparatus, and a sensing apparatus as a multi-edge computing device; and learn an output torque compensation value for output torque correction using a fed-back result based on a residual reinforcement learning model;

interwork with a wearable device to determine a driver health condition and to change vehicle driving performance based on the driver health condition;

analyze learned parameters shared by the plurality of vehicles to determine an optimal torque learning compensation value;

predict future energy required by using the driver driving propensity and the driving situation for each driver based on the learning algorithm;

determine the output torque for driving a motor by using the future energy required; and determine an appropriateness of the output torque based on a difference between the output torque and a final output torque fed back from a vehicle end control apparatus, and wherein the wearable device is configured to:

transmit a driver health status and various driving commands to the mobile device; and collect driver body changes to provide the driver body changes to the mobile device, and include a smart watch, a wearable band, and smart glasses.

6. The system of claim 5, wherein the vehicle driving control apparatus is further configured to correct the output torque for a driving motor torque using the information for determining the output torque received from the server.

7. The system of claim 5, wherein the vehicle driving control apparatus is further configured to determine the driver driving propensity by using a driver ID or a driver propensity pattern received from the mobile device or accelerator position sensor (APS)/brake pedal sensor (BPS) signals, a longitudinal acceleration, a lateral acceleration, or a vehicle speed received from the autonomous driving control apparatus.

8. The system of claim 7, wherein the vehicle driving control apparatus is further configured to predict energy to be required in a future by using a driver position pattern, driving position traffic, or driving position weather received from the mobile device, or road information, front vehicle information, the vehicle speed, or acceleration received from the autonomous driving control apparatus.

9. The system of claim 5, wherein the server is further configured to:

analyze additional driving data based on a driver propensity for each driver ID of a plurality of driver IDs or each vehicle ID of a plurality of vehicle IDs based on the learning algorithm; and determine a learned parameter for correcting the output torque for each driver ID or vehicle ID.

10. The system of claim 5, wherein the information for determining the output torque comprises the output torque and a learned parameter for correcting the output torque.

11. The system of claim 10, wherein the server is further configured to perform integrated control by platooning the plurality of vehicles and transmitting the learned parameter and the output torque to the platooned plurality of vehicles.

12. The system of claim 5, further comprising:

the vehicle end control apparatus configured to output the final output torque using the output torque received from the vehicle driving control apparatus or a learned parameter of the learning algorithm for determining the output torque.

13. A vehicle driving control method, the method comprising:

collecting driving data based on a driver driving propensity and a driving situation from a plurality of vehicles;

changing information for determining an output torque suitable for each of the plurality of vehicles by analyzing the driving data;

interworking with a wearable device to determine driver health condition and to change vehicle driving performance based on the driver health condition;

analyzing learned parameters shared by the plurality of vehicles to determine an optimal torque learning compensation value;

predicting future energy required by using the driver driving propensity and the driving situation for each driver based on a learning algorithm;

determining the output torque for driving a motor by using the future energy required; and determining an appropriateness of the output torque based on a difference between the output torque and a final output torque fed back from a vehicle end control apparatus, wherein the wearable device is configured to:

transmit a driver health status and various driving commands to a mobile device; and collect driver body changes to provide the driver body changes to the mobile device, and include a smart watch, a wearable band, and smart glasses.

14. The method of claim 13, wherein changing the information for determining the output torque comprises:

analyzing additional driving data based on a driver propensity for each driver ID of a plurality of driver IDs or each vehicle ID of a plurality of vehicle IDs based on the learning algorithm; and determining a learned parameter for correcting the output torque for each driver ID or vehicle ID.

15. The method of claim 14, wherein changing the information for determining the output torque comprises:

performing integrated control by platooning the plurality of vehicles; and transmitting the learned parameter and the output torque to the platooned plurality of vehicles.

16. The method of claim 14, wherein the information for determining the output torque comprises the output torque and the learned parameter for correcting the output torque.

* * * * *